W. M. DICE.
LOCKING WASHER FOR NUTS.
APPLICATION FILED JAN. 5, 1916.

1,183,174.

Patented May 16, 1916.

Witness
John W. Kittredge

Inventor
Wm. M. Dice.
By C. E. Humphrey.
Attorney.

UNITED STATES PATENT OFFICE.

WILLIAM M. DICE, OF AKRON, OHIO.

LOCKING-WASHER FOR NUTS.

1,183,174.

Specification of Letters Patent.

Patented May 16, 1916.

Application filed January 5, 1916. Serial No. 70,503.

*To all whom it may concern:*

Be it known that I, WILLIAM M. DICE, a citizen of the United States, residing at Akron, in the county of Summit and State of Ohio, have invented new and useful Improvements in Locking-Washers for Nuts, of which the following is a specification.

This invention relates to devices for holding rotatable members against unintentional reverse rotation and has especial relation to devices for preventing nuts from backing off or becoming unscrewed from the threaded shanks of bolts and similar instrumentalities.

The object of the invention is to provide a simple and efficient device adapted to be interposed between a rotatable member such as a nut and the object which the nut is intended to hold, for preventing unintentional reverse rotation, unscrewing or backing off of the nut.

More specifically, the device embodies a resilient washer having locking means arranged to be interposed between the nut and the object against which the nut bears for preventing the unscrewing of the nut.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

Figure 1:
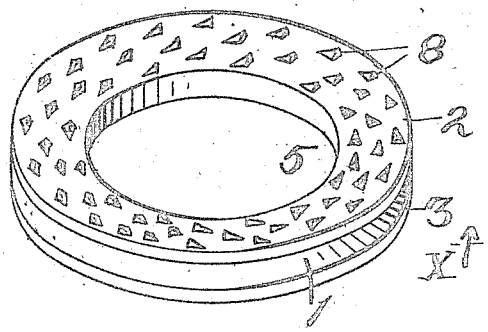
Figure 3:
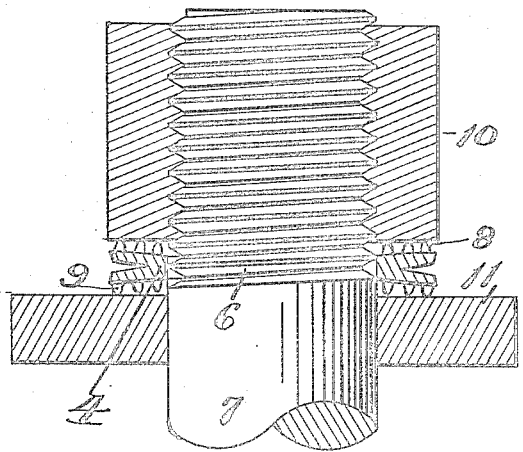
Figure 2:
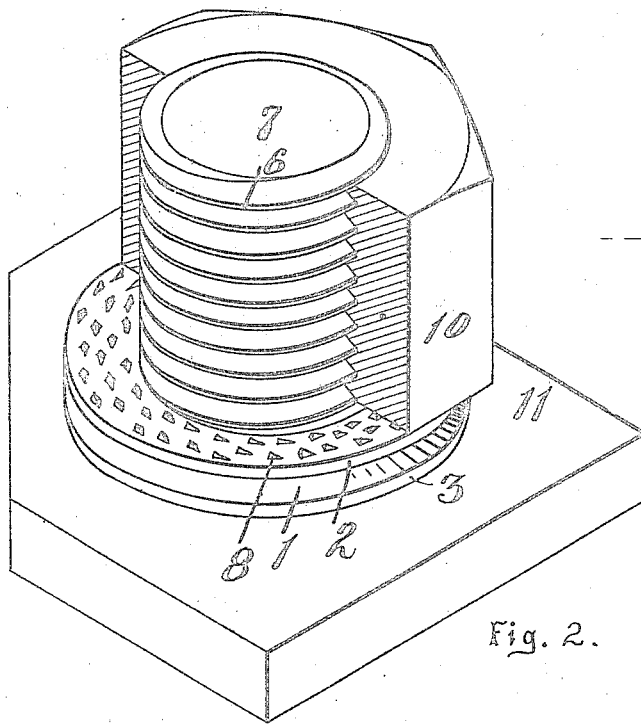
Figure 4:
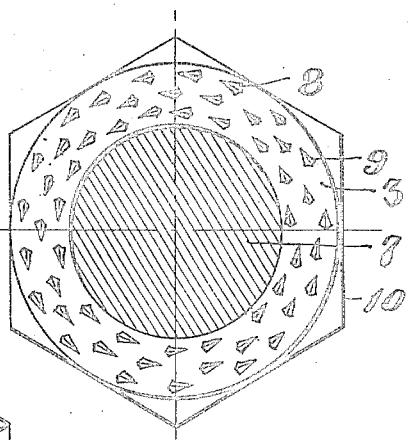

In the drawings in which similar reference numerals indicate like parts in the different figures, Figure 1, is a perspective view of a locking washer embodying this invention shown in its expanded condition; Fig. 2, is a view similar to Fig. 1 showing the threaded shank end of a bolt with a nut thereon and my improved washer in position to be engaged by the nut; Fig. 3, is a vertical, central, sectional view of the device shown in Fig. 2 showing the washer in its compressed condition; and, Fig. 4, is a horizontal section taken on line X of Fig. 3.

The device which forms the subject matter of this invention consists of an integral annular member formed of resilient material such as steel, and provided with a peripheral groove 1 preferably V-shaped in cross section so as to provide an upper portion 2 and a lower portion 3 united at their inner portions 4. The upper and lower portions are preferably in the form of hollow conic frusta with the apices opposing each other. The annular member provides an opening 5 for the reception or passage therethrough of some instrument such as the threaded shank end 6 of a bolt 7. The upper face of the upper portion 2 is provided with a plurality of projections or teeth 8 with the working portions of the projections or teeth all pointing in the same general direction and arranged circumferentially around the upper face of the portion 2. The lower face of the portion 3 is provided with a plurality of projections or teeth 9 preferably formed similarly to the projections 8 but with the working portions thereof reversely positioned or directed in an opposite direction to the working portions of the teeth 8. When the locking washer 1 is in its normal or uncompressed condition the peripheral edges of the portions 2 and 3 are widely separated one from the other, as clearly shown in Figs. 1 and 2 and as these portions 2 and 4 are of resilient or spring material the constant tendency of these portions 2 and 3 is to return to their normal and expanded condition.

As an example of the mode of using my improved locking washer, there is shown in the drawing, a bolt 7 provided with a threaded shank 6 which receives an ordinary nut 10 in the usual manner. The nut 10 is arranged to engage some object such, for instance, as a member 11 but in ordinary use, a nut such as the nut 10 will in time become loose and back off from the threaded end 6 of the nut 7. In order to prevent this, I interpose my improved locking washer between the nut 10 and the member 11 and as the nut 10 is screwed down it forces the two portions 2 and 3 toward each other, overcoming the natural resiliency of the material of which the washer is composed and in doing this the under face of the nut rides freely over the projections 8 on the upper face of the portion 2, the direction of rotation of the nut and the direction of the working portions of the teeth 8 being such as to permit this operation. However, any reverse rotation of the nut causes the teeth to embed their working points in the material of the nut thus constituting efficient locking means for preventing reverse rotation of the nut. The drawing up of the nut 10 also embeds the teeth or projections 9 on the under face of the members 3 firmly in the upper surface of the object 11, thereby securely anchoring the washer against any reverse rotation in connection with the nut, due to the fact that the teeth 9 are reversely arranged with respect to the working portions of the teeth 8.

During the drawing up of the nut 10 the peripheral edges of the portions 2 and 3 are forced toward each other thereby causing the teeth 8 and 9 to embed themselves to a certain extent in the under face of the nut 10 and the upper face of the object 11 and the spring-like or resilient nature of the washer tends to hold these teeth in constant locking position.

If it is desired at any time to remove the nut and washer, some pointed or wedge-shaped tool is driven into the space between the upper face of the portion 2 of the washer and the upper face of the nut 10, in a space between the teeth 8, which operation serves to pry the teeth 8 from engagement with the under face of the nut 10 and the nut 10 can then be unscrewed or backed off from the threaded end 6 in the usual manner.

I claim:—

1. A locking member comprising an integral annular body of resilient material provided on the peripheral edge thereof with a circumferential groove, one of the end faces of said member provided with means adapted to co-act with an adjacent member for preventing unintentional rotation of either member.

2. A locking washer comprising an integral annular body member of resilient material provided on the peripheral edge thereof with a circumferential groove, one of the faces of said washer provided with teeth.

3. A locking washer comprising an integral annular body member of resilient material provided on the peripheral edge thereof with a circumferential groove, both of the faces of said washer provided with teeth.

4. A locking washer comprising an integral annular body member of resilient material provided on the peripheral edge thereof with a circumferential groove, both of the faces of said washer provided with teeth, the working portions of the teeth on one face reversely positioned with respect to the teeth on the other face.

5. A locking washer comprising an annular body member of resilient material provided on the peripheral edge thereof with a circumferential washer, said groove serving to partially divide said washer into upper and lower portions, said portions being in the form of hollow conic frusta with their apices united and opposing each other.

6. A locking washer comprising an annular body member of resilient material provided on the peripheral edge thereof with a circumferential washer, said groove serving to partially divide said washer into upper and lower portions, said portions being in the form of hollow conic frusta with their apices united and opposing each other, one of the faces of said washer provided with teeth.

7. A locking washer comprising an annular body member of resilient material provided on the peripheral edge thereof with a circumferential washer, said groove serving to partially divide said washer into upper and lower portions, said portions being in the form of hollow conic frusta with their apices united and opposing each other, both of the faces of said washer provided with teeth, the working portions of the teeth on one face being reversely positioned with respect to the teeth on the other face.

In testimony whereof I have hereunto set my hand.

WILLIAM M. DICE.